United States Patent
Keller et al.

(10) Patent No.: US 9,066,213 B2
(45) Date of Patent: Jun. 23, 2015

(54) NODE FOR SHORT MESSAGE CONTEXT

(75) Inventors: Ralf Keller, Würselen (SE); Magnus Olsson, Stockholm (SE); Hans Rönneke, Kungsbacka (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 213 days.

(21) Appl. No.: 13/639,986

(22) PCT Filed: Aug. 1, 2012

(86) PCT No.: PCT/EP2012/065021
§ 371 (c)(1),
(2), (4) Date: Oct. 8, 2012

(87) PCT Pub. No.: WO2014/019616
PCT Pub. Date: Feb. 6, 2014

(65) Prior Publication Data
US 2014/0113667 A1    Apr. 24, 2014

Related U.S. Application Data

(60) Provisional application No. 61/560,881, filed on Nov. 17, 2011.

(51) Int. Cl.
*H04W 4/00* (2009.01)
*H04W 4/14* (2009.01)
*H04W 88/14* (2009.01)

(52) U.S. Cl.
CPC ............ *H04W 4/14* (2013.01); *H04W 88/14* (2013.01)

(58) Field of Classification Search
None
See application file for complete search history.

(56) References Cited

U.S. PATENT DOCUMENTS

| | | |
|---|---|---|
| 2006/0136560 A1 | 6/2006 | Jiang |
| 2009/0129372 A1 | 5/2009 | Pandey et al. |
| 2012/0077467 A1 | 3/2012 | Fan et al. |
| 2012/0093086 A1 | 4/2012 | Yin et al. |
| 2012/0102127 A1 | 4/2012 | Shaheen |
| 2012/0218889 A1* | 8/2012 | Watfa et al. ............ 370/230 |

OTHER PUBLICATIONS

International Search Report dated May 6, 2013 for PCT Application No: PCT/EP2012/065021; PCT Application Date: Aug. 1, 2012 consisting of 4-pages.

* cited by examiner

*Primary Examiner* — Erika A Washington
(74) *Attorney, Agent, or Firm* — Christopher & Weisberg, P.A.

(57) ABSTRACT

A node for use in a cellular system, arranged to establish a context for a User Equipment, UE, for the message types of Short Message Service, SMS, Small Data and Trigger Information. The node is arranged to establish the context when the UE performs an Initial Attach to the cellular system and indicates support for at least one said message types. The node is arranged to have two modes available for the context, those modes being a Currently Serving mode and a Forwarding mode, when in the Currently Serving mode, messages are delivered to the UE, and, when in the Forwarding mode, messages are forwarded to a node that is in the Currently Serving mode at the moment.

20 Claims, 6 Drawing Sheets

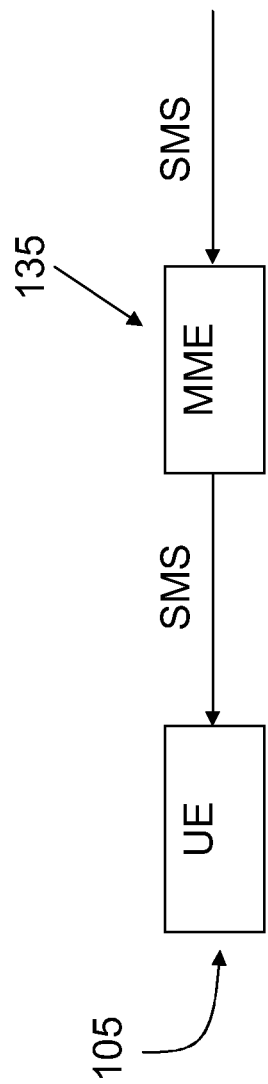

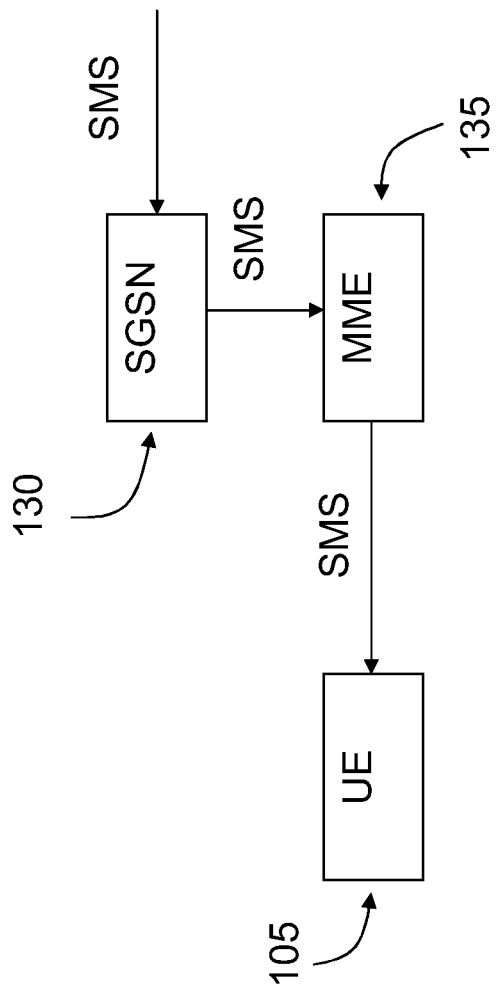

NODE FOR SHORT MESSAGE CONTEXT

TECHNICAL FIELD

The present invention discloses a node for a short message context in a cellular system.

BACKGROUND

In today's cellular systems, Short Message Service, SMS, has become a popular method for transmitting short messages between mobile devices. The transfer of SMSs is performed by means of a so called Short Message Center, an SMC, sometimes also referred to as an SMS-C, in the cellular system.

However, in a cellular system there are also other kinds of messages which contain quite small amounts of information but which still need to be transmitted within the system with as high a degree of efficiency as possible. Examples of such other kinds of messages include so called Small Data, as defined in for example, 3GPP specification TS 23.888 and Trigger Information, as defined in, for example, 3GPP specification TS 23.682.

SUMMARY

It is an object of the invention to obtain a device by means of which the transfer of SMS, Small Data and Trigger Information can be transferred to a User Equipment, a UE, in a cellular system, in a manner which is as efficient as possible.

This object is achieved by means of a node for use in a cellular system. The node is arranged to establish a context for a User Equipment, a UE, for the message types SMS, Small Data and Trigger Information.

In addition, the node is arranged to establish the context when the UE performs an Initial Attach to the cellular system and indicates support for at least one of said message types or for said context as such.

The node is arranged to have two modes available for the context, those modes being a "Currently Serving" mode and a "Forwarding" mode, where, in the Currently Serving mode, messages of said types are delivered to the UE, and, in the Forwarding mode, messages of said types are forwarded to a node that is in the Currently Serving mode at the moment.

In embodiments, the node is arranged to toggle from the Forwarding mode to the Currently Serving mode if the UE performs a Routing Area Update or a Tracking Area Update.

In embodiments, the node is arranged to toggle from the Forwarding mode to the currently serving mode if there is an originating service request from the UE.

In embodiments, the node is arranged to toggle from the currently serving mode to the Forwarding mode if another node indicates to the node that the other node is in the currently serving mode.

In embodiments, the node is arranged to, when the node toggles from the Forwarding mode to the Currently Serving mode, report this toggling to its Home Subscriber Server or to the Home Location Register.

In embodiments, the node is an MME for use in an LTE system.

In embodiments, the node is an SGSN for use in a UTRAN or a GERAN system.

BRIEF DESCRIPTION OF THE DRAWINGS

The invention will be described in more detail in the following, with reference to the appended drawings, in which FIGS. 2-6 show examples of short message contexts.

DETAILED DESCRIPTION

Figure 1:
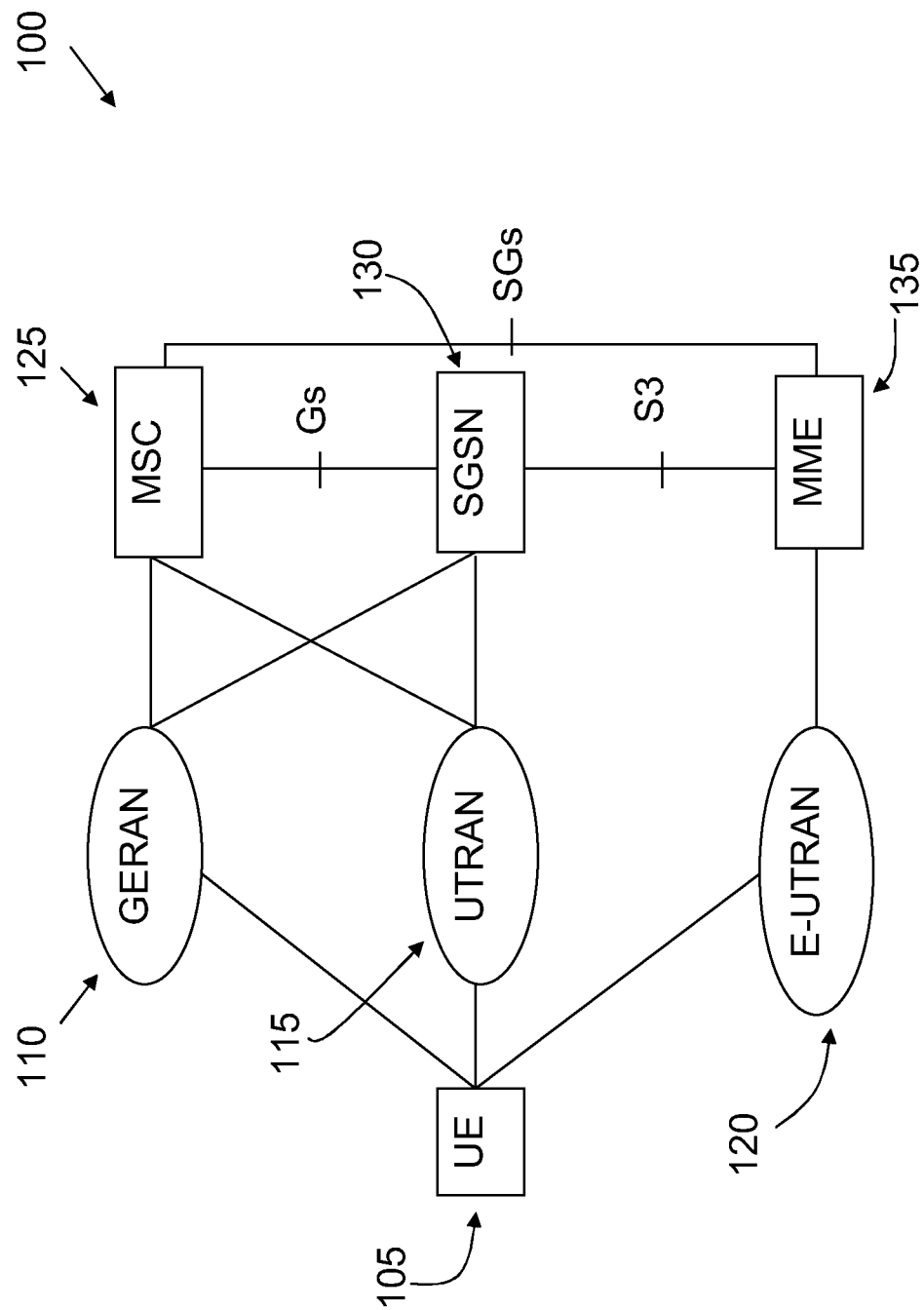
FIG. 1 shows interfaces and nodes in a cellular system with components from various standards.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows an overview of a cellular system 100 which as such comprises "sub-systems", i.e. cellular systems which are radio access networks of different kinds of standards. Hence, the cellular system 100 comprises nodes and components from these different kinds of cellular standards. The cellular system 100 can accommodate a number of User Equipments, UEs, one of which, 105, is shown by way of example.

The different kinds of radio access networks which are comprised in the cellular system 100 are a GERAN network 110, an UTRAN network 115 and an E-UTRAN network 120, sometimes also referred to as an LTE network.

It should be pointed out that there are a number of nodes in each network which are not shown in FIG. 1, such as, for example, the controlling node of the cell of the UE 105. However, nodes in the different radio access networks which the UE 105 is in connection with include the following, as shown in FIG. 1:

The GERAN radio access network 110 makes use of a Mobile Switching Centre, an MSC 125, and the UTRAN radio access network 115 makes use of a Serving GPRS Support Node, an SGSN 130, which can also perform controlling functions in the GERAN network. The E-UTRAN (LTE) radio access network makes use of a Mobility Management Entity, MME 135.

Naturally, there are interfaces between the different radio access networks 110, 115 and 120, as well as between the nodes of those radio access networks. Some of these interfaces include the interface between the MSC 125 and the SGSN 130, which is known as the Gs interface, and the interface between the SGSN 130 and the MME 135, known as the S3 interface. In addition, there is also an interface between the MSC 125 and the MME 135, known as the SGs interface. These interfaces are shown in FIG. 1.

In order to facilitate for the system 100 when delivering messages of a number of "short message" types (which will be introduced below shortly), the invention discloses a node which is arranged to establish a context for a UE such as the UE 105 for messages of said short message types. The short message types include the message types SMS, Short Data (i.e. Small Data as defined in 3GPP Specification TS 23.888) and Trigger Information, as defined in, for example, 3GPP specification TS 23.682

The context which the node is arranged to establish can be seen as a Short Message context, i.e. an "SM context".

The node in question can be either an SGSN for use in an UTRAN or a GERAN system or an MME for use in an LTE system, e.g. the node can be the SGSN 130 and/or the MME 135. The SM context is established by the SGSN 130 or the MME 135 when the UE 105 performs an Initial Attach to the system 100, i.e. when the UE performs a first time Radio Area Update or Tracking Area Update to a serving node, the serving node here being either the MME 135 or the SGSN 130. In addition to performing the Initial Attach, the UE 105 should also indicate one or more of the following:

SMS Support,

Small Data Support,

A specific indication of support for Short Messages, "SM support".

The indications above can be seen as indications of a "Short Message" ability in the UE 105.

The Short Message context has two modes, here referred to as the Currently Serving mode and the Forwarding mode, and the node (i.e. the SGSN/MME) can toggle between these two modes, as triggered by events.

Figure 2:
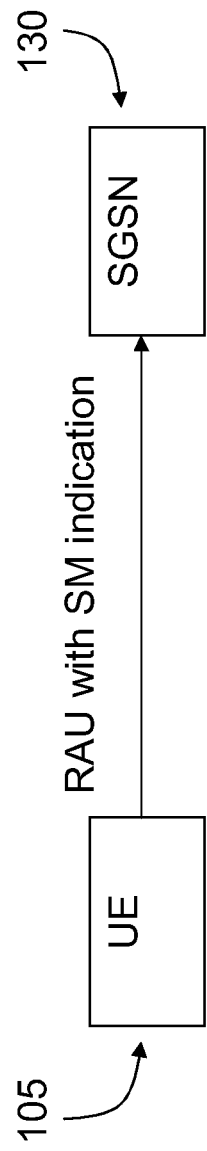

As exemplified by FIG. 2, in one example in the UTRAN network 115, the SGSN 130 establishes the SM context when the UE 105 performs a first time RAU and also provides an SM indication to the SGSN. The SM indication may, for example, be an indication that the UE 105 supports SMS or Small Data, or the SM context as such. In addition, the SM context can also be established by the SGSN 130 if it implicitly assumes that the UE 105 supports SMS. The example of Initial Attach shown in FIG. 2 would also have been valid for the MME 135 in the E-UTRAN/LTE network 120, in which case the UE 105 would have performed a first time TAU with the corresponding SM indication, as described above.

Figure 3:
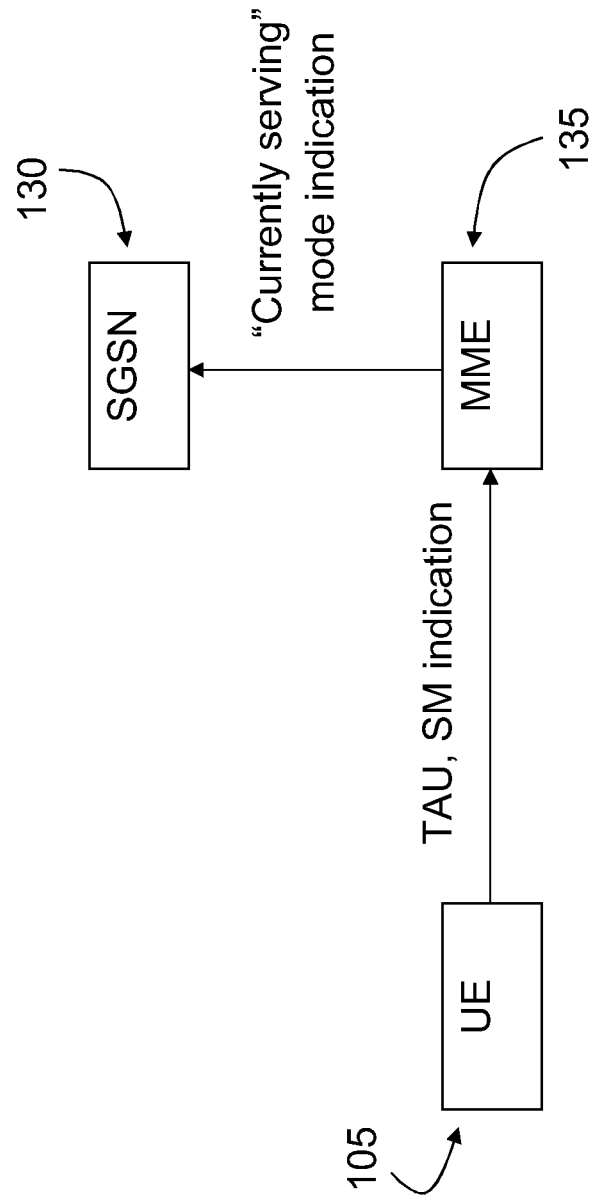

The example shown in FIG. 3 illustrates another possible event in a node, in this case an MME 135: the UE 105 moves within the cellular system 100 from the UTRAN network 115 to the E_UTRAN or LTE network 120, and thus also moves from the SGSN 130 to the MME 135. In connection with the move between the two radio access networks, the UE 105 performs a Tracking Area Update to the MME 135, and also transmits one or more of the SM indications listed previously to the MME 135. The MME 135 establishes the SM context, and assumes the Currently Serving mode.

In one embodiment, as is also shown in FIG. 3, the MME 135 also notifies the SGSN 130 that the MME 135 has now established the SM context for the UE 105 and is in the Currently Serving mode, as a consequence of which the SGSN 130 toggles into the Forwarding Mode, since there is no need for more than one node at a time to be in the Currently Serving mode for one and the same UE. In the event of a move such as that shown in FIG. 3, if the UE performs a TAU, the MME contacts the previously serving node, in this case the SGSN 130, in order to retrieve certain information, such as information on the SM context. In addition, the MME 135 knows from information in the TAU if there is a need to establish an SM context at all for the UE. Also, for example, if the SGSN is a "legacy" SGSN, i.e. an SGSN which does not support SM context, then no information on an SM context will be provided by the legacy SGSN, from which the MME can conclude that no SM context need be established in connection with the move.

In the Forwarding mode, a node, i.e. either an MME or an SGSN, will forward short messages destined for the UE 105 to the node which at the moment is in the Currently Serving mode for the UE in question.

Figure 4:
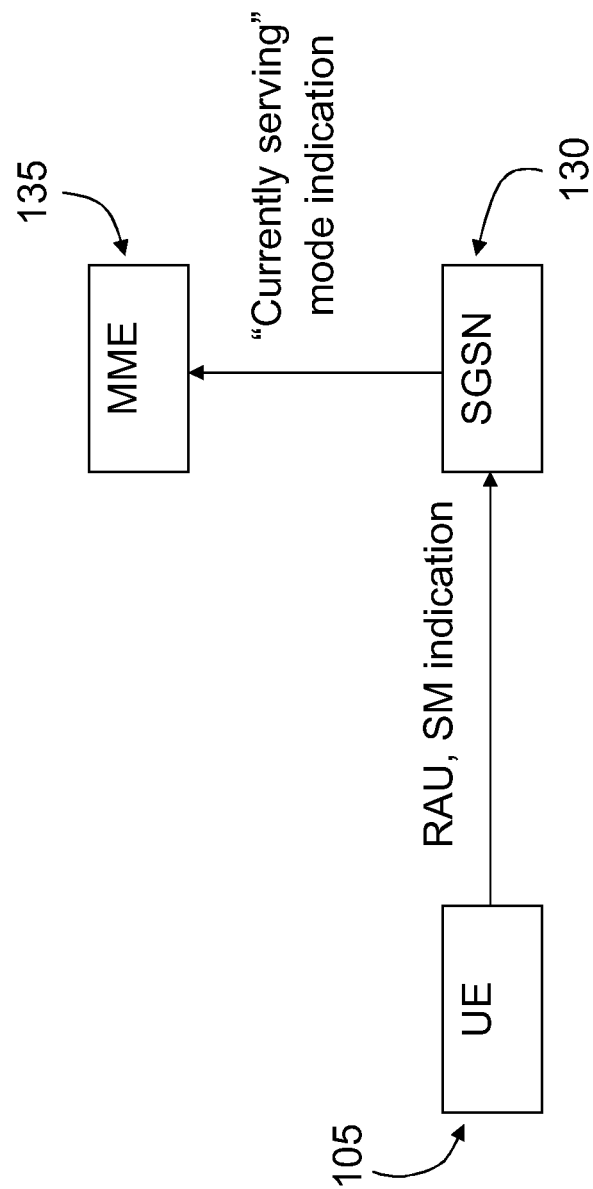

FIG. 4 shows that the "reverse" move as compared to that shown in FIG. 3 is also possible, i.e. the UE 105 moves from the LTE system 120 to the UTRAN system 115, and the "serving SM node" becomes the SGSN 130 instead of the MME 135. In this case, the UE performs a Routing Area Update, a RAU, to the SGSN, as well as transmitting one or more of the SM indications listed previously to the SGSN 130. In similarity to what is shown in FIG. 3, the SGSN 130 will then assume the Currently Serving mode, and will notify the MME 135 of this, following which the MME 135 will assume the Forwarding mode.

The examples shown in FIGS. 3 and 4 have illustrated that a node (SGSN or MME) which is in the Currently Serving mode can toggle to the Forwarding mode. Naturally, the opposite is also possible, i.e. a node which is in the Forwarding mode can toggle to the Currently Serving mode. This happens, when, for example, with renewed reference to the examples of FIGS. 3 and 4, the TAU or the RAU is not the initial attach by that UE to that MME or SGSN. In addition, if the UE has an originated request for SMS/small data or other service, the contacted MME or SGSN toggles to Currently Service mode if it is in the Forwarding Mode.

In other words, if, as shown in FIG. 2, the UE 105 has performed an Initial Attach to the cellular system 100 via a first time RAU to the SGSN 130 and the SGSN 130 has established an SM context for the UE 105 and has entered the Currently Serving mode of the SM context, and the UE then "moves" to the MME 135 (or to another SGSN), as was the case in the example of FIG. 3, the SGSN 130 will enter the Currently Serving mode when the UE 105 again performs a RAU to the SGSN 130 and moves back to the UTRAN network 115 which the SGSN 130 serves. A similar reasoning is valid for the MME 135 once the MME has established an SM context for the UE 105 and has been in the Currently Serving mode, from which the MME 135 has assumed the Forwarding mode.

FIG. 5 shows how a node, in this example the MME 135, which is capable of the Short Message Context and which is in the Currently Serving mode, delivers an incoming SMS to the UE 105. The MME 135 receives the SMS from another node in the system, and delivers the SMS to its intended recipient, i.e. the UE 105, since the MME 135 is in the Currently Serving mode.

In addition, in embodiments, a node such as the SGSN 130 or the MME 135 which enters the Currently Serving mode will report this to its Home Location Register, HLR, or to its Home Subscriber Server, HSS, where the address to a UE's Currently Serving node may be stored. Such reports to the HLR/HSS can be sent either when the node establishes the context for the first time or when the node enters the Currently Serving mode from the Forwarding mode. Thus, a node which is in the Forwarding node can obtain the address to the node which is in the Currently Serving mode for a certain UE from the UE's HSS or HLR.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A node (130, 135) for use in a cellular system (110, 125, 120), the node being arranged to establish a context for a User Equipment, UE (105), for the message types of Short Message Service, SMS, Small Data and Trigger Information, the node (130, 135) being arranged to:

establish said context when the UE (105) performs an Initial Attach to the cellular system and indicates support for one of:
at least one of said message types; and
said context; and have two modes available for said context, said two modes being a Currently Serving mode and a Forwarding mode, when in the Currently Serving mode, messages of said message types are delivered to the UE (105), and, when in the Forwarding mode, messages of said message types are forwarded to a node (130, 135) that is in the Currently Serving mode at the time of forwarding.

2. The node (130, 135) of claim 1, the node being further arranged to toggle from the Forwarding mode to the Currently Serving mode if the UE (105) performs one of a Routing Area Update and Tracking Area Update.

3. The node (130, 135) of claim 2, the node being further arranged to toggle from the Forwarding mode to the Currently Serving mode if there is an originating service request from the UE (105).

4. The node (135) of claim 3, the node being a Mobility Management Entity, MME (135), for use in a Long Term Evolution/Evolved-Universal Terrestrial Radio Access Network, LTE/E-UTRAN, system (120).

5. The node (130, 135) of claim 4, the node being further arranged to toggle from the Currently Serving mode to the Forwarding mode if another node indicates to the node (130, 135) that the other node is in the Currently Serving mode.

6. The node (130, 135) of claim 5, the node being further arranged to, when the node toggles from the Forwarding mode to the Currently Serving mode, report the toggling to one of a Home Subscriber Server and Home Location Register.

7. The node (130, 135) of claim 2, the node being further arranged to toggle from the Currently Serving mode to the Forwarding mode if another node indicates to the node (130, 135) that the other node is in the Currently Serving mode.

8. The node (130, 135) of claim 7, the node being further arranged to, when the node toggles from the Forwarding mode to the Currently Serving mode, report the toggling to one of a Home Subscriber Server and Home Location Register.

9. The node (135) of claim 8, the node being a Mobility Management Entity, MME (135), for use in a Long Term Evolution/Evolved-Universal Terrestrial Radio Access Network, LTE/E-UTRAN, system (120).

10. The node (130) of claim 8, the node being a Serving General Packet Radio Service Support Node, SGSN (130), for use in a Universal Terrestrial Radio Access Network, UTRAN, system (115).

11. The node (130, 135) of claim 1, the node being further arranged to toggle from the Forwarding mode to the Currently Serving mode if there is an originating service request from the UE (105).

12. The node (130, 135) of claim 11, the node being further arranged to toggle from the Currently Serving mode to the Forwarding mode if another node indicates to the node (130, 135) that the other node is in the Currently Serving mode.

13. The node (130, 135) of claim 12, the node being further arranged to, when the node toggles from the Forwarding mode to the Currently Serving mode, report the toggling to one of a Home Subscriber Server and Home Location Register.

14. The node (130, 135) of claim 11, the node being further arranged to, when the node toggles from the Forwarding mode to the Currently Serving mode, report the toggling to one of a Home Subscriber Server and Home Location Register.

15. The node (130, 135) of claim 1, the node being further arranged to toggle from the Currently Serving mode to the Forwarding mode if another node indicates to the node (130, 135) that the other node is in the Currently Serving mode.

16. The node (135) of claim 15, the node being a Mobility Management Entity, MME (135), for use in a Long Term Evolution/Evolved-Universal Terrestrial Radio Access Network, LTE/E-UTRAN, system (120).

17. The node (130) of claim 15, the node being a Serving General Packet Radio Service Support Node, SGSN (130), for use in a Universal Terrestrial Radio Access Network, UTRAN, system (115).

18. The node (130, 135) of claim 1, the node being further arranged to, when the node toggles from the Forwarding mode to the Currently Serving mode, report the toggling to one of a Home Subscriber Server and Home Location Register.

19. The node (135) of claim 1, the node being a Mobility Management Entity, MME (135), for use in a Long Term Evolution/Evolved-Universal Terrestrial Radio Access Network, LTE/E-UTRAN, system (120).

20. The node (130) of claim 1, the node being a Serving General Packet Radio Service Support Node, SGSN (130), for use in a Universal Terrestrial Radio Access Network, UTRAN, system (115).

* * * * *